United States Patent [19]

Tokoro et al.

[11] Patent Number: 5,340,841
[45] Date of Patent: Aug. 23, 1994

[54] PRODUCTION METHOD OF FOAMED PARTICLES OF POLYOLEFIN RESIN

[75] Inventors: Hisao Tokoro, Tochigi; Satoru Shioya; Akira Hinokawa, both of Utsunomiya, Japan

[73] Assignee: JSP Corporation, Tokyo, Japan

[21] Appl. No.: 166,827

[22] Filed: Dec. 15, 1993

[30] Foreign Application Priority Data

Dec. 28, 1992 [JP] Japan .................. 4-360031

[51] Int. Cl.$^5$ .............. C08J 9/08; C08J 9/22
[52] U.S. Cl. ................... 521/60; 521/56; 521/59; 521/143; 521/144
[58] Field of Search .......... 521/56, 59, 60, 143, 521/144

[56] References Cited

U.S. PATENT DOCUMENTS

| | | | |
|---|---|---|---|
| 4,046,846 | 9/1977 | Fujimori | 521/60 |
| 4,656,197 | 4/1987 | Yoshimura et al. | 521/60 |
| 4,676,939 | 6/1987 | Kuwabara | 521/60 |
| 4,687,641 | 8/1987 | Maeda et al. | 521/60 |
| 4,766,157 | 8/1988 | Yamada et al. | 521/60 |
| 4,778,829 | 10/1988 | Ichimura et al. | 521/60 |

Primary Examiner—Morton Foelak
Attorney, Agent, or Firm—Sherman and Shalloway

[57] ABSTRACT

Disclosed herein is a method of producing foamed particles of a polyolefin resin, which are prevented from fusion-bonding among the particles upon their production, and exhibit excellent moldability without impeding fusion bonding property among the foamed particles upon their molding. The method includes dispersing the particles of the polyolefin resin along with a finely particulate silicate mineral as a dispersing agent and at least carbon dioxide as a foaming agent in a dispersion medium in a closed vessel, heating the dispersion to impregnate the resin particles with the foaming agent, and then releasing the resin particles and dispersion medium into an atmosphere of a pressure lower than the internal pressure of the vessel, thereby expanding the resin particles.

7 Claims, No Drawings

PRODUCTION METHOD OF FOAMED PARTICLES OF POLYOLEFIN RESIN

BACKGROUND OF THE INVENTION

1) Field of the Invention

The present invention relates to a production method of foamed particles of a polyolefin resin.

2) Description of the Related Art

Foamed moldings of polyolefin resins have been widely used in various fields such as packaging materials and cushioning materials. A foamed molding of this kind is produced by filling foamed particles of a polyolefin resin, which have been produced in advance, into a mold to expand them under heat. As a production process of the foamed particles used in producing this foamed molding of the polyolefin resin, it has been known to disperse particles of a polyolefin resin and a foaming agent in a dispersion medium such as water in a closed vessel, to heat the resultant dispersion so as to impregnate the resin particles with the foaming agent, and then to release the resin particles and the dispersion medium into an atmosphere of a pressure lower than the internal pressure of the vessel, thereby expanding the particles.

Upon the production of the foamed particles of the polyolefin resin by the above-described process, the dispersing agent is generally added to the dispersion medium for the prevention of fusion bonding among the resin particles dispersed in the dispersion medium in the closed vessel. Calcium hydroxide, calcium carbonate, tricalcium phosphate, basic zinc carbonate and the like have been known as dispersing agents of this kind.

In general, the dispersing agent can not achieve a sufficient anti-fusing effect in a small amount. In addition, if it would be used in a great amount, the fusion bonding property among the resulting foamed particles upon their molding will be impeded.

On the other hand, volatile organic compounds such as flons and butane have heretofore been used as foaming agents useful in the production of foamed particles. As has already been proposed by the present applicant (assignee), it has already been known to use carbon dioxide as a foaming agent (U.S. Pat. No. 4,464,484 or EP-A-0113903). For such reasons as carbon dioxide is cheap, in recent years, carbon dioxide, mixtures of carbon dioxide and a conventional volatile organic compound such as a flon, and the like have come to be often used as foaming agents in consideration of the intended expansion ratio and the like.

The present inventors continued to investigate as to the improvement of a production method of foamed particles making use of carbon dioxide as a foaming agent on the basis of the method described in U.S. Pat. No. 4,464,484 or EP-A-0113903. As a result, it was found that when carbon dioxide and basic magnesium carbonate are used as a foaming agent and a dispersing agent, respectively, to expand resin particles, the resultant foamed particles do not undergo their mutual fusion bonding upon their production, but are well fusion-bonded to one another upon their molding (Japanese Patent Publication No. 41942/1988). In this method, the preferable amount of basic magnesium carbonate used as the dispersing agent is said to be 0.1–3.0 parts by weight per 100 parts by weight of the resin. However, a further investigation of the present inventors proved that although a good result can be obtained in this method even if the amount of basic magnesium carbonate to be used is relatively small when carbon dioxide is used in a small amount, a satisfactory result may not be always obtained in some cases if the amount of the basic magnesium carbonate to be used is within the above range when carbon dioxide is used in a large amount.

This cause is considered to be as follows. Both basic magnesium carbonate and conventional dispersing agents as described above are soluble in acids. Since a dispersion medium becomes acid when carbon dioxide is used, the dispersing agent used is dissolved in a dispersion medium, thereby reducing the effective amount as a dispersing agent. Since the acidity of the dispersion medium becomes high as the amount of carbon dioxide used increases, the effect of the dispersing agent is lowered correspondingly. It was also found that this phenomenon occurs not only upon the use of basic magnesium carbonate, but also upon the use of the above-described dispersing agents such as calcium hydroxide, calcium carbonate, calcium phosphate and basic zinc carbonate.

In order to solve such a problem, it is only necessary to add the dispersing agent in excess according to the acidity of the dispersion medium in consideration of the amount dissolved in the dispersion medium. However, this has required a complicated operation that the amount of the dispersing agent to be added is determined while taking a change in acidity of the dispersion medium, which may vary according to the proportion of carbon dioxide in the foaming agent, into consideration. In addition, there has also been a problem that since the dispersing agent in an amount more than needs is added to the dispersion medium, the cost of treatment is expensive upon waste water treatment for the dispersion medium.

According to an investigation by the present inventors, the solution of the above problem without increasing the amount of the dispersing agent to be used requires the combined use of a surfactant with the dispersing agent. However, the amount of the surfactant to be used must be increased as the amount of the dispersing agent to be used decreases. There have hence been problems that a cost is expensive due to the increased amount of the surfactant, and the cost of a waste water treatment for the dispersion medium containing the surfactant therein also comes expensive.

On the other hand, finely particulate aluminum oxide has also been known as a dispersing agent. It has been proved that when finely particulate aluminum oxide is used as a dispersing agent, the above problem can be solved even if carbon dioxide is used as a foaming agent. However, finely particulate aluminum oxide is produced only in extremely few countries. Therefore, many countries are dependent upon importation. The importing countries have involved a problem that finely particulate aluminum oxide is expensive and difficult to procure stably. There has also been a potential problem that since hydrochloric acid used in its production process remains in finely particulate aluminum oxide for all its small amount, the internal wall of a closed vessel used in the production of foamed particles may be corroded when finely particulate aluminum oxide is used as a dispersing agent over a long period of time.

SUMMARY OF THE INVENTION

The present inventors have carried out a further extensive investigation with a view toward solving the above-described problems. As a result, it has been found that when a finely particulate silicate mineral stably available in many countries is used as a dispersing agent, the above-described problems attendant on the production of foamed particles making use of carbon dioxide can be solved, leading to completion of the present invention.

In one aspect of the present invention, there is thus provided a method of producing foamed particles of a polyolefin resin by heating a dispersion comprising particles of the polyolefin resin, which contains at least carbon dioxide as a foaming agent, a dispersing agent and a dispersion medium in a closed vessel and then releasing the dispersion into an atmosphere of a pressure lower than the internal pressure of the vessel to expand the resin particles, which comprises using a finely particulate silicate mineral as the dispersing agent.

According to the present invention, the finely particulate silicate mineral is used as a dispersing agent for preventing the mutual fusion bonding of the resin particles. Therefore, even when carbon dioxide used as a foaming agent is dissolved in the dispersion medium, so that the dispersion medium turns acid, there is no potential problem that the dispersing agent may be dissolved in the dispersion medium. It is therefore possible to sufficiently prevent the fusion bonding of the resin particles using a small amount of the dispersing agent.

Since the finely particulate silicate mineral is used as a dispersing agent and the amount of the dispersing agent to be added may be made small, there is no potential problem that the dispersing agent may impede the mutual fusion bonding of the resulting foamed particles upon their molding will be impeded, whereby a good molded article excellent in fusion bonding property among the foamed particle can be obtained.

In addition, the saving of the amount of the dispersing agent to be used is also economically advantageous because the costs of not only raw materials but also waste water treatment for the dispersion medium can be reduced. According to the present invention, further, there is no need to add a large amount of a surfactant even if the amount of the dispersing agent is reduced. Therefore, there is no potential problem that the production cost may increase due to the addition of a large amount of the surfactant, and the cost of the waste water treatment for the dispersion medium containing a large amount of the surfactant therein may rise.

DETAILED DESCRIPTION OF THE INVENTION AND PREFERRED EMBODIMENTS

Illustrative examples of the polyolefin resin useful in the practice of this invention may include low-density polyethylene, high-density polyethylene, linear low-density polyethylene, ethylene-propylene copolymers, butene-propylene copolymers, ethylene-butene-propylene copolymers and the like. The polyolefin resins used in the present invention may or may not be crosslinked. However, uncrosslinked polyolefin resins are particular advantageous. When the polyolefin resin is a copolymer, it may be a block copolymer or a random copolymer. In the present invention, the ethylene-propylene random copolymers, butene-propylene random copolymers or ethylene-butene-propylene random copolymers, which all contain 80-99 wt. % of a propylene component, and linear low-density polyethylene are particularly preferred as the polyolefin resin.

In this invention, carbon dioxide alone, mixtures of carbon dioxide and a volatile organic foaming agent, mixtures of carbon dioxide and another inorganic gas other than carbon dioxide, and the like may be used as a foaming agent.

Carbon dioxide may be used in any form of solid (dry ice), liquid and gas. When it is used as a mixture with the volatile organic compound, another inorganic gas or the like, these components may be mixed in advance or separately added to a dispersion medium to mix them in the dispersion medium.

Examples of the volatile organic compound mixed with carbon dioxide may include aliphatic hydrocarbons such as propane, butane, pentane, hexane and heptane, alicyclic hydrocarbons such as cyclobutane and cyclopentane, halogenated hydrocarbons such as trichlorofluoromethane, dichlorodifluoromethane, dichlorotetrafluoroethane, methyl chloride, ethyl chloride and methylene chloride, and the like.

The weight ratio of carbon dioxide to the volatile organic compound is preferably 1:0 to 1:10, particularly 1:0 to 1:8.

Preferable example of said another inorganic gas usable in the mixture with carbon dioxide may include those scarcely having problems of toxicity and combustibility, such as air, oxygen, nitrogen, helium and argon. Of these, air is particularly preferred from the viewpoint of economy. The weight ratio of carbon dioxide to the inorganic gas is preferably 1:0 to 1:10, particularly 1:0 to 1:8.

When the mixture of carbon dioxide and the volatile organic compound or another inorganic gas is used as a foaming agent, the expansion ratio of the resulting foamed particles can be changed by changing the mixing ratio of the carbon dioxide. The expansion ratio may also be changed by the amount of the foaming agent to be used. If foamed particles high in expansion ratio are intended to obtain, it is only necessary to increase the amount of the foaming agent to be used.

As described above, the amount of the foaming agent to be used varies depending on the intended expansion ratio, and besides on the kind of base resins even when foamed particles having the same expansion ratio as each other are intended to obtain. When foamed particles having an expansion ratio of about 5–60 times are provided, however, the amount of the foaming agent to be used is generally 1–15 parts by weight per 100 parts by weight of the resin in the case where carbon dioxide is used alone.

Examples of the finely particulate silicate mineral useful as a dispersing agent in the present invention may include talc, mica, kaolin and the like. The silicate mineral preferably has an average particle size of 0.01–30 $\mu$m, particularly 0.01–10 $\mu$m. It is preferable to use the silicate mineral in a range of 0.05–1.0 part by weight per 100 parts by weight of the resin. The use of the dispersing agent in a proportion lower than 0.05 part by weight makes it difficult to sufficiently achieve the effect of preventing the mutual fusion bonding of the resin particles in their expansion process. On the other hand, if the dispersing agent is used in a proportion exceeding 1.0 part by weight, its effect can not be more enhanced. In particular, if the amount exceeds 3.0 parts by weight, the resulting foamed particles involve a potential problem that the fusion bonding property among the particles may be impeded upon their molding.

Since a possibility of lowering the fusion bonding property among the foamed particles upon their molding and a problem that the cost of the waste water treatment for the dispersion medium increases are raised as the amount of the dispersing agent to be used increases, the amount of the dispersing agent to be used may preferably be the least possible amount within limits permitting the prevention of the mutual fusion bonding of the resin particles in their foaming process. Since the finely particulate silicate mineral used in the present invention is hardly soluble in acids, its effect can be exhibited in a small amount in the foaming process making use of the carbon dioxide-based foaming agent.

In this invention, a small amount of a surfactant may be used in combination as a dispersion aid for effectively dispersing the resin particles by a small amount of the dispersing agent. As described above, the use of the surfactant in a large amount causes the increase in cost of the waste water treatment for the dispersion medium. However, the dispersion aid may not be necessarily added where the dispersing agent is a silicate mineral. If it is added, its amount may be extremely small, and at most about 0.02 part by weight per 100 parts by weight of the resin will be enough.

Artionic surfactants such as sodium alkylbenzene-sulfonates, sodium α-olefinsulfonates and sodium alkylsulfonates are preferred as the surfactants useful as dispersion aids.

In the present invention, the dispersion medium dispersing the resin particles along with the foaming agent therein in the presence of the dispersing agent may be any medium not dissolving the resin particles therein. For example, water, methanol, ethanol, glycerol, ethylene glycol and the like may be used. Water is however used in general. The amount of the dispersion medium to be used on the basis of the amount of the resin particles is preferably 150–1000 parts by weight per 100 parts by weight of the resin particles in that the resin particles are fully dispersed therein.

The method according to the present invention preferably adopts a process in which the particles of the polyolefin resin, dispersing agent, foaming agent and the like are dispersed in the dispersion medium in a closed vessel such as an autoclave, and the contents are then heated to a temperature of at least the softening temperature of the resin particles to impregnate the resin particles with the foaming agent. This heating temperature varies depending on the kind of the resin used, and the like, but is generally 90°–170° C.

After the resin particles are impregnated with the foaming agent to impart foamability to the resin particles, the resin particles in the closed vessel are held at a foamable temperature and the vessel is then opened at one end thereof at the same temperature so as to release the foamable resin particles along with the dispersion medium into an atmosphere of a pressure lower than the internal pressure of the vessel, thereby expanding the resin particles. It is preferable to hold the foamable resin particles at the foamable temperature for 3–120 minutes prior to their release from the vessel. The atmosphere into which the foamable resin particles are released may be any atmosphere of a pressure lower than the internal pressure of the vessel. However, the foamable resin particles are generally released into an atmosphere under atmospheric pressure. In order to smoothly conduct the release of the resin particles from the vessel and to stabilize the expansion ratio of the resulting foamed particles, it is preferable to release the resin particles while introducing inorganic gas such as air, nitrogen or carbon dioxide under high pressure.

The present invention will hereinafter be described in further detail by the following examples.

EXAMPLES 1–7 AND COMPARATIVE EXAMPLES 1–7

One hundred parts by weight of particle samples of an ethylene-propylene random copolymer (content of ethylene component: 2.4 wt. %, MI=10 g/10 min, density: 0.9 g/cm$^3$) were each dispersed along with its corresponding foaming agent (carbon dioxide), dispersing agent and dispersion aid, i.e., sodium dodecylbenzene-sulfonate (the dispersion aid was used in Example 7 and Comparative Example 3 and 6 only) shown in table 1 in 300 parts by weight of water in a closed vessel. After heating the resultant dispersion to 151° C. with stirring and holding the dispersion at the same temperature for 0.25 hour, the vessel was opened at one end thereof at the same temperature to release the dispersion under atmospheric pressure while introducing high-pressure nitrogen gas into the vessel, thereby expanding the resin particles. After drying the foamed particles thus obtained, whether mutual fusion bonding of the foamed particles occurred or not was determined and the apparent expansion ratio of the foamed particles was measured. The results are shown in Table 1. Incidentally, the apparent expansion ratio of the foamed particles was determined by dividing the true density of the resin particles used by the bulk density of the resultant foamed particles.

After allowing the foamed particles to stand for 24 hours at room temperature and atmospheric pressure and then subjecting them for 24 hours to a pressurizing treatment with air at 20° C. and 2 kg/cm$^2$.G, they were filled in a mold of 300 mm×300 mm×40 mm (inside dimension) and then heated with 3.2 kg/cm$^2$.G of steam, whereby molding was effected. After the resultant molded article was dried for 24 hours in an oven at 60° C., the condition of fusion bonding among the foamed particles in the molded article was determined. The results are also given in Table 1.

Incidentally, the resultant foamed particle samples in Comparative Examples 1–3 were free from any fusion bonding as with the foamed particle samples in Examples 1–7, and molded articles obtained by using these foamed particle samples were good in fusion bonding property among the foamed particles. However, the results of Comparative Examples 1–3 are results obtained for the first time by using a large amount of the dispersing agent or using a large amount of sodium dodecylbenzenesulfonate in combination compared with those of the Examples equal in the amount of the foaming agent to be used. The addition of a large amount of the dispersing agent and/or the dispersion aid is not preferred because an increase in the cost of a waste water treatment is caused.

Incidentally, whether mutual fusion bonding of the foamed particles occurred in the production process of the foamed particles was evaluated by observing each of the resultant foamed particle samples after its drying and ranking it in accordance with the following standard:

| | |
|---|---|
| Foamed particles free from any fusion bonding among them and having a good spherical form | ○ |
| Fusion-bonded among particles in the autoclave | x |

Besides, whether the fusion bonding property among the foamed particles in each molded article was good or not was evaluated by bending a sample of 10 mm in thickness, 25 mm in width and 300 mm in length, which had been cut out of the molded article, along a peripheral surface of a cylinder of 20 mm in diameter to observe the section of the sample when the sample cracked, and ranking it in accordance with the following standard:

| | |
|---|---|
| No interparticle breakage occurred, but non-interparticle breakage occurred | o |
| Interparticle breakage occurred | x | ing high-pressure nitrogen gas into the vessel, thereby expanding the resin particles. After drying the foamed particles thus obtained, in the same manner as described above, whether mutual fusion bonding of the foamed particles occurred or not was determined and the apparent expansion ratio of the foamed particles was measured. The results are shown in Table 2.

After allowing the foamed particles to stand for 24 hours at room temperature and atmospheric pressure, they were filled in the same mold as those used in Examples 1-7 and then heated with 0.9 kg/cm$^2$.G of steam, whereby molding was effected. After the resultant molded article was dried for 24 hours in an oven at 80° C., the condition of fusion bonding among the foamed particles in the molded article was determined in the

TABLE 1

| | Amount of foaming agent (carbon dioxide) added (wt. part) | Dispersing agent | | | Amount of dispersion aid (sodium dodecylbenzene-sulfonate added (wt. part) | Foamed particles | | Condition of fusion bonding property among foamed particles in molded article |
|---|---|---|---|---|---|---|---|---|
| | | Kind | Average particle size (μm) | Amount added (wt. part) | | Apparent expansion ratio (times) | Occurrence of fusion bonding of particles | |
| Ex. 1 | 4 | Talc | 1.4 | 0.3 | — | 12 | o | o |
| Ex. 2 | 7.5 | Talc | 1.4 | 0.3 | — | 30 | o | o |
| Ex. 3 | 7.5 | Mica | 8.0 | 0.3 | — | 30 | o | o |
| Ex. 4 | 7.5 | Mica | 3.0 | 0.3 | — | 30 | o | o |
| Ex. 5 | 4 | Kaolin | 0.4 | 0.3 | — | 12 | o | o |
| Ex. 6 | 7.5 | Kaolin | 0.4 | 0.3 | — | 30 | o | o |
| Ex. 7 | 7.5 | Kaolin | 0.4 | 0.1 | 0.004 | 30 | o | o |
| Comp. Ex. 1 | 4 | Basic magnesium carbonate | 10 | 1.2 | — | 12 | o | o |
| Comp. Ex. 2 | 7.5 | Basic magnesium carbonate | 10 | 2.0 | — | 30 | o | o |
| Comp. Ex. 3 | 7.5 | Basic magnesium carbonate | 10 | 1.0 | 0.04 | 30 | o | o |
| Comp. Ex. 4 | 4 | Basic magnesium carbonate | 10 | 1.0 | — | — | x | — |
| Comp. Ex. 5 | 7.5 | Basic magnesium carbonate | 10 | 1.8 | — | — | x | — |
| Comp. Ex. 6 | 7.5 | Basic magnesium carbonate | 10 | 1.0 | 0.01 | — | x | — |
| Comp. Ex. 7 | 4 | Basic magnesium carbonate | 10 | 2.0 | — | 12 | o | x |

EXAMPLES 8-11

One hundred parts by weight of particle samples of linear low-density polyethylene (density: 0.925 g/cm$^3$, MI=1.0 g/10 min, borax content: 0.2%), and their corresponding foaming agents (carbon dioxide) and dispersing agents, both shown in table 2, were separately used in combination with 0.002 part by weight of sodium dodecylbenzenesulfonate to disperse the respective mixtures in 300 parts by weight of water in closed vessels. After heating each of the resultant dispersions to 119° C. with stirring and holding the dispersion at the same temperature for 0.25 hour, the vessel was opened at one end thereof at the same temperature to release the dispersion under atmospheric pressure while introducing same manner as described above. The results are also given in Table 2.

TABLE 2

| | Amount of foaming agent (carbon dioxide) added (wt. part) | Dispersing agent | | | Foamed particles | | Condition of fusion bonding property among foamed particles in molded article |
|---|---|---|---|---|---|---|---|
| | | Kind | Average particle size (μm) | Amount added (wt. part) | Apparent expansion ratio (times) | Occurrence of fusion bonding of particles | |
| Ex. 8 | 5 | Talc | 1.4 | 0.2 | 6 | o | o |
| Ex. 9 | 10 | Talc | 1.4 | 0.2 | 10 | o | o |
| Ex. 10 | 5 | Mica | 3.0 | 0.2 | 6 | o | o |
| Ex. 11 | 10 | Mica | 3.0 | 0.2 | 10 | o | o |

What is claimed is:

1. A method of producing foamed particles of a polyolefin resin by heating a dispersion comprising particles of the polyolefin resin, which contains at least carbon dioxide as a foaming agent, a dispersing agent and a dispersion medium in a closed vessel and then releasing the dispersion into an atmosphere of a pressure lower than the internal pressure of the vessel to expand the resin particles, which comprises using a finely particulate silicate mineral as the dispersing agent.

2. The method as claimed in claim 1, wherein the silicate mineral has an average particle size of 0.01–30 μm.

3. The method as claimed in claim 1, wherein the silicate mineral is used in a proportion of 0.05–1.0 part by weight per 100 parts by weight of the resin.

4. The method as claimed in claim 1, wherein the polyolefin resin is linear low-density polyethylene or a random copolymer of propylene with ethylene and/or butene, which contains 80–99 wt. % of a propylene component.

5. The method as claimed in claim 1, wherein the foaming agent is carbon dioxide.

6. The method as claimed in claim 1, wherein the foaming agent is a mixed foaming agent containing carbon dioxide and a volatile organic foaming agent in a proportion of 10 parts by weight or less per part by weight of carbon dioxide.

7. The method as claimed in claim 1, wherein the foaming agent is a mixed foaming agent containing carbon dioxide and another inorganic gas than carbon dioxide in a proportion of 10 parts by weight or less per part by weight of carbon dioxide.

* * * * *